United States Patent [19]

Azamatov et al.

[11] Patent Number: 4,984,817
[45] Date of Patent: Jan. 15, 1991

[54] FULLY ARTICULATED SUSPENSION OF TANDEM WHEELS OF A TRANSPORT VEHICLE

[75] Inventors: Ramil A. Azamatov, Naberezhnye Chelny; Mikhail N. Zamitter, Kiev; Evgeny M. Zema, Sinelnikovo; Vladimir A. Nedorezov, Sinelnikovo; Anatoly K. Oblovatsky, Sinelnikovo; Igor G. Smirnov, Naberezhnye Chelny, all of U.S.S.R.

[73] Assignee: Kievsky Injenerno-Stroitelny Institut, Kiev, U.S.S.R.

[21] Appl. No.: 335,783

[22] PCT Filed: Jul. 23, 1987

[86] PCT No.: PCT/SU87/00081
§ 371 Date: Mar. 22, 1989
§ 102(e) Date: Mar. 22, 1989

[87] PCT Pub. No.: WO89/00926
PCT Pub. Date: Feb. 9, 1989

[51] Int. Cl.$^5$ .............................................. B60G 5/04
[52] U.S. Cl. ...................................... 280/680; 280/686
[58] Field of Search ........................ 280/676, 680, 686

[56] References Cited

U.S. PATENT DOCUMENTS

| | | | |
|---|---|---|---|
| 2,206,359 | 7/1940 | Larison | 280/680 |
| 2,665,142 | 1/1954 | Talbert | 280/680 |
| 3,261,622 | 7/1966 | Hutchens | 280/680 |
| 3,367,677 | 2/1968 | Preddy, Jr. | 280/680 |
| 3,806,148 | 4/1974 | Boulton | 280/680 |
| 4,570,971 | 2/1986 | Perlini | 280/680 |

FOREIGN PATENT DOCUMENTS

| | | |
|---|---|---|
| 401546 | 11/1974 | U.S.S.R. |
| 1053910 | 11/1983 | U.S.S.R. |
| 1374548 | 11/1974 | United Kingdom |

Primary Examiner—Kenneth R. Rice
Attorney, Agent, or Firm—Lilling & Greenspan

[57] ABSTRACT

A fully articulated suspension of tandem wheels of a transport vehicle having a frame (1) with axles (2) has torque reaction rods (17, 18, 19, 20) linked with the axles, at least one pair of double-arm levers (3), each linked mechanically with the frame (1) and, by one of its arms (4), with the corresponding axle (2) by an assembly (8) for the transmission of static and dynamic loads. Articulated to the other arm (5) of the corresponding double-arm lever (3) are stirrup-shaped plate springs (22, 23) of the corresponding spring assembly (21) for the absorption of dynamic loads.

7 Claims, 2 Drawing Sheets

FULLY ARTICULATED SUSPENSION OF TANDEM WHEELS OF A TRANSPORT VEHICLE

TECHNICAL FIELD

The present invention relates to devices for absorption of dynamic loads and, more particularly, to fully articulated suspensions of tandem wheels of a transport vehicle.

BACKGROUND OF THE INVENTION

Nowadays a widespread development of transport facilities, their diversity and functional capabilities has imposed new requirements for the design of shock-absorbing suspensions, particularly articulated arm suspensions.

Known in the prior art is a fully articulated suspension of tandem wheels of a transport vehicle (GB, B, 1374548) having a frame with axles, said suspension comprising at least one pair of double-arm levers, each mechanically linked with the frame and the corresponding axle of the transport vehicle, means for absorption of dynamic loads, each articulated to one the arms of the corresponding double-arm lever, and torque reaction rods, each linked by one end with the frame and by the other end with the corresponding axle of the transport vehicle.

In this suspension the means for absorption of dynamic loads comprises a compression coil spring whose ends are mechanically linked with the corresponding arms of double-arm levers.

However, owing to the fact that the arms of the double-arm lever in this suspension are considerably stiff, the compression coil spring should absorb all the dynamic loads arising in the ascending axle which causes the linearity of the flexible characteristic of the suspension.

Besides, the compression coil spring in this suspension provides for absorption of the dynamic loads arising only during the working stroke of the suspension which impairs absorption of the dynamic loads originated during the rebound stroke.

SUMMARY OF THE INVENTION

The main object of the present invention is to provide an articulated suspension of tandem wheels of a transport vehicle having such additional means and also means for absorption of the dynamic loads which would make it possible to increase reliability of the suspension and to raise quietness of movement of the transport vehicle.

This object is achieved by providing a fully articulated suspension of tandem wheels of a transport vehicle having a frame with axles, sais suspension comprising at least one pair of double-arm levers each mechanically linked with the frame and the corresponding axle of the transport vehicle, means for absorption of dynamic loads each of said means being articulated to one the arms of the corresponding double-arm lever, and torque reaction rods, one end of each rod being connected with the frame while its other end is connected with the corresponding axle of the transport vehicle wherein, according to the invention, said suspension additionally contains as many means for the transmission of static and dynamic loads as there are the double-arm levers said loads arising due to interaction of each axle of the transport vehicle with the corresponding means for absorption of dynamic loads via the other arm of the double-arm lever, each of them being mechanically linked with the corresponding axle of the transport vehicle and with the other one of said arms of the double arm lever, the means for absorption of dynamic loads comprising two stirrup-shaped plate springs which ensure a constant contact between each means for the transmission of static and dynamic loads with the corresponding axle, each of said springs being articulated with the first of said arms of the corresponding double-arm lever.

It is expedient that the stirrup-shaped plate springs in the fully articulated suspension be arranged in parallel with each other, the ends of each spring being articulated with the corresponding double-arm levers of the corresponding pair of double-arm levers.

It is desirable that the stirrup-shaped plate springs in the fully articulated suspension be arranged in tandem, one end of one of said springs being mechanically linked with the closer end of the other spring while their other ends be articulated with the corresponding double-arm levers of the corresponding pair of double-arm levers.

It is expedient that each means for transmission of static and dynamic loads in the fully articulated suspension should comprise a pack of leaf springs one end of which would rest on the corresponding axle of the transport vehicle, a slot made in the body of the first of said arms of the double-arm lever to accommodate the other ends of the leaf springs contained in the pack of leaf springs, and a clamp plate installed on these ends of leaf springs above the slot.

Sometimes it is preferable that each means for transmission of static and dynamic loads in the fully articulated suspension should be made in the form of a shackle one end of which is articulated to the corresponding axle of the transport vehicle while its other end is linked with the corresponding double-arm lever.

It is beneficial if the mechanical linkage in the fully articulated suspension between the closer ends of the stirrup-shaped plate springs of the means for absorption of dynamic loads should be constituted by a fixing element additionally introduced into said means and articulated to said ends.

It is desirable that the fixing element in the fully articulated suspension of the means for absorption of dynamic loads sould be made in the form of a strip with a projection, said strip arranged between the closer ends of the stirrup-shaped plate springs.

The present invention is equally suitable for absorbing dynamic loads acting in the transport vehicle both during the working and rebound strokes of the suspension thereby increasing its reliability.

Besides, the present invention ensures the nonlinearity of the flexible characteristic of the suspension thereby promoting the quietness of movement of the x transport vehicle.

BRIEF DESCRIPTION OF THE DRAWINGS

Other objects and advantages of the present invention will be dealt with below by considering examples of its with reference, to the accompanying drawings in which.

BEST MODE FOR CARRYING OUT THE INVENTION

Figure 1:
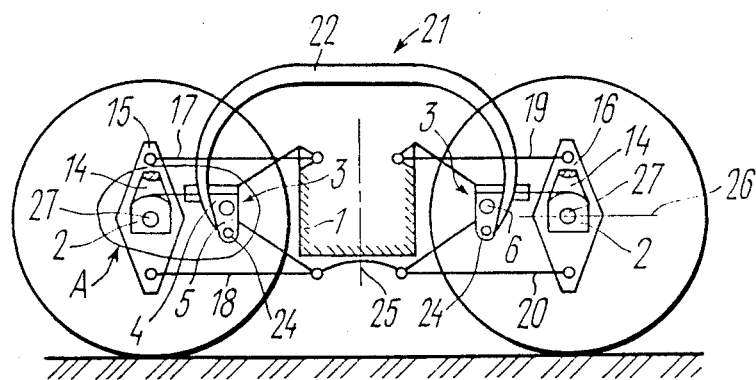
FIG. 1 is a general view of the fully articulated suspension of tandem wheels of a transport vehicle according to the invention.

The fully articulated suspension of tandem wheels of a transport vehicle having a frame 1 (FIG. 1) with two axles 2 comprises two double-arm levers 3. The bases of the main 4 (FIGS. 1,2) and auxiliary 5 arms of each lever 3 are articulated with the frame 1 by an axle 6 (FIG. 3) secured to the frame 1 (FIG. 1) by a shaped washer 7 (FIG. 2). The suspension contains as many means 8 (FIGS. 2, 3) for the transmission of static and dynamic loads as there are double-arm levers 3 (FIG. 1) each of said means having a pack 9 (FIG. 2) of leaf springs 10, one end of said springs being located in the slot 11 (FIG. 3) made in the body of the arm 4 of each lever 3 (FIG. 1) installed on which is the profiled surface of clamp plate 12 secured to the arm 4 by screws 13. The other ends of the leaf springs 10 in the pack 9 (FIG. 2) rest on the profiled surfaces of axles 2 (FIG. 1) each of said surface being provided with a stop 14 (FIGS. 1,2) with a buffer limiting the motion of these ends. The axles 2 (FIG. 1) are mounted with brackets 15, 16. Articulated to bracket 15 are one ends of torque reaction rods 17, 18, while one ends of the torque reaction rods 19, 20 are articulated to bracket 16. The other ends of rods 17, 18, 19, 20 are articulated to the frame 1.

The suspension comprises a means 21 for the absorption of dynamic loads made of two stirrup-shaped plate springs 22, 23 (FIGS. 2, 3) arranged in parallel with each other, their ends being articulated with the arm 5 of each lever 3 by pins 24. The static position of the suspension is nominally shown by the line 25 (FIG. 1) which is square to the line 26 connecting the axes 27 of the axles 2.

In another embodiment of the fully articulated suspension of tandem wheels of a transport vehicle the means 21 for the absorption of dynamic loads comprises two stirrup-shaped plate springs 28, 29 (FIG. 4) arranged in tandem. Located between the closer ends 30, 31 of the springs 28, 29, respectively, is a fixing element in the form of a strip 32 with a projection 33, said strip being articulated with said ends 30, 31. The other ends 34, 35 of the springs 28, 29, respectively, are linked by articulated joints 36, 37 with the corresponding levers 38. Like described above, one ends of the torque reaction rods 17, 18 and 19, 20 are articulated, respectively, to the brackets 15, 16 while their other ends in this embodiment are articulated to the bracket 39 secured to the frame 1. Each means for the transmission of static and dynamic loads has the shape of a shackle 40 one end of which is articulated to the corresponding axle 2 while its other end, to the double-arm lever 38.

Figure 2:
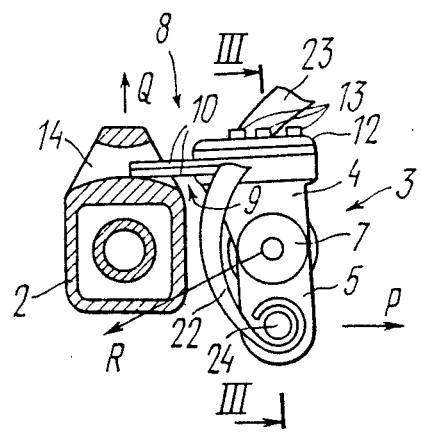
FIG. 2 is fragment A in FIG. 1; enlarged, with the bracket removed (cross section of the axle of a transport vehicle), according to the invention.
Figure 5:
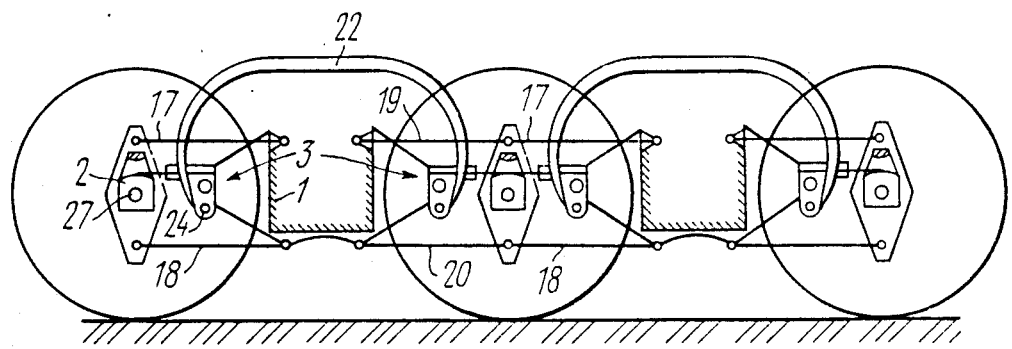
FIG. 5 is a general view of the fully articulated suspension of tendem wheels of a transport vehicle as shown in FIG. 1 with three axles, according to the invention.

FIG. 5 illustrates the frame of a transport vehicle with three axles 2 located between which are the disclosed fully articulated suspensions similar to the suspension shown in FIG. 1.

Figure 3:
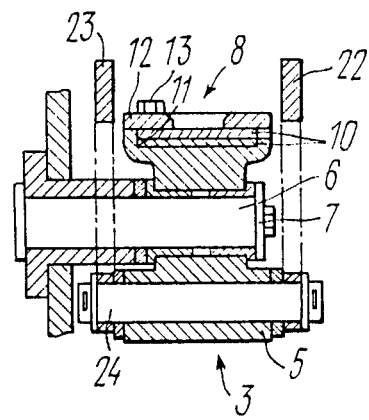
FIG. 3 is a view along line III—III in FIG. 2 (cross section)

The fully articulated suspension of tandem wheels of a transport vehicle shown in FIGS. 1, 2, 3 functions as follows.

If the suspension is subjected only to the gravitational forces of the wheels and axles 2, said axles 2 are displaced progrssively from the static position (line 26) towards the bearing surface on which the transport vehicle rests in a static position. In this case the buffers of the stops 14 act on the leaf springs 10 in the pack 9 and, via said springs, on the double-arm levers 3. Turning simultaneously counterclockwise and clockwise, the levers 3 compress the stirrup-shaped plate springs 22, 23. The moment created by the gravitational force of the axles 2, wheels and all associated elements is counterbalanced by the moment of reactive forces of springs 22, 23 applied to the arms 5 of the levers 3. The gravitational force is transmitted to the frame 1 via axles 6.

The suspension functions in a similar way during the rebound stroke on the moving vehicle. In this case the springs 22, 23 working in compression and bending ensure efficient absorption of inertia loads acting on the suspension elements.

If during the transition from the loated to the x unloaded state the reactive force from the side of the bearing surface acts on the wheel linked to one of the axles 2, said axle 2 will move upward. Its surface contacting the spring 10 in the pack 9 will act on the arm 4 of the lever 3 and this lever lever 3 will start turning clockwise about its axle 6. Inasmuch as the reactive force on the other axle 2 is still nonexistent, the springs 22, 23 moved by the lever 3 will pull the arm 5 of the other lever 3 and the latter will start turning also clockwise so that its arm 4 and pack 9 will act on the surface of the axle 2.

Meanwhile, the other wheel will be going down to the point when it encounters the resistance of, say, the beating surface after which the reactive forces on both wheels will begin equalizing and, eventually, will become the same and the levers 3, springs 22, 23 and parallel-link mechanisms formed by the torque reaction rods 17, 18, 19, 20 will come to the positions symmetrical with relation to line 25. In this case the springs 22, 23 act in the capacity of balance arms. The same balancing capacities of the springs 22, 23 are revealed in all cases of suspension loading, and ensure equalization of load on the wheels. If this is impossible to achieve, for instance, when one of the wheels rollis into a hole, the other wheel without losing touch with the bearing surface will be ascending to the point when its axle 2 reaches the buffer (not shown in the drawing) on the frame 1 of the transport vehicle.

Under normal service conditions the loads on the wheels will be the same within the entire range of their changes.

The ensile deformation of springs 22, 23 will correspond to the load of the transport vehicle because the turning angles of the double-arm levers 3 will grow together with the load.

An important feature of the hereinproposed suspension lies in the possibility of obtaining the desired nonlinear flexible characteristic most beneficial for the transport vehicle in question.

This can be achieved, firstly, because the positions of the points of contact between the surfaces of the axles 2 and springs 10 of the pack 9 change during the progressive movement of the axles 2 with the changing load. The displacement of the contact points depends both on the initial position of the levers 3 and on the profile of the surfaces of axles 2 on which the springs 10 of the pack 9 rest. Secondly, the deflections of the springs 22, 23 are proportionate to the sines of the angles at which the arms 4 of the levers 3 decline from the line perpendicular to line 25. Hence, these longitudinal deformations (deflections) change non-linearly in response to the load and the degree of this non-linearity depends on the initial angle of the arms 5 of levers 3.

Thirdly, the varying load changes the cantilevered length of the springs 10 in the pack 9. The larger portion of springs 10 in the pack 9 rests in service on the clamp plate 12, the shorter becomes the cantilevered portion. Consequently, the deformation (deflection) of these portions will change non-linearly in response to the selected profile of the surface of clamp plate 12 contacting said portions. The best solution is when this surface is of such a nature that at a present load the flexible deformation of these portions of the springs 10 of the pack 9 would ensure their complete contact with the surface of the clamp plate 12.

The side loads transmitted to the suspension from the bearing surface or the buffers are taken by the wheels and transmitted by the stops 14 to the packs 9 and further to the levers 3 from which, via axles 6, they are transmitted to the frame 1. Simultaneously, these side loads are taken and transmitted to the frame 1 by the trussed structures formed in the plane parallel to the bearing surface by the axles 2 and twinned rods 17, 18 and 19, 20.

The longitudinal forces as well as reactive and braking torques applied to the suspension are transmitted to the frame 1 by the same torque reaction rods 17, 18, 19, 20 on the same principle as in other prior-art suspensions comprising such rods.

Figure 4:
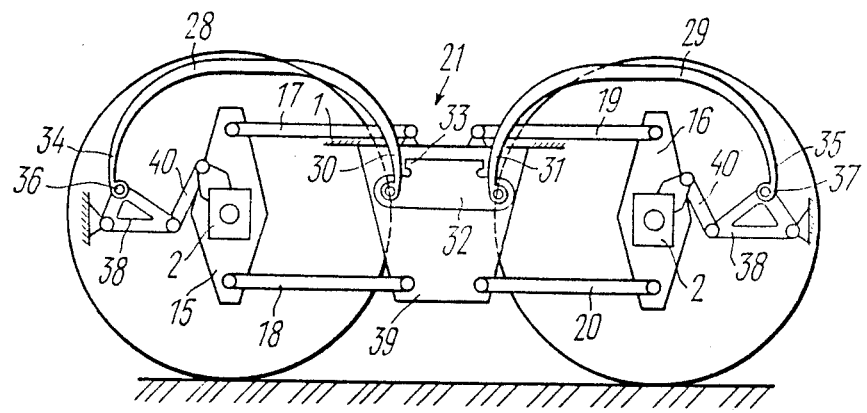
FIG. 4 is a general view of the fully articulated suspension of tandem wheels of a transport vehicle shown in FIG. 1 with stirrup-shaped plate springs arranged in tandem, according to the invention.

The fully articulated suspension of tandem wheels of a transport vehicle as shown in FIG. 4 functions as follows.

The kinematic layout of this suspension is identical with that of the suspension shown in FIG. 1. The balancing ability of the suspension is achieved by the same methods as in suspension illustrated in FIG. 1.

The non-linearity of the flexible characteristic of the suspension is attained not only by the non-linearity of flexible characteristics of the stirrup-shaped plate springs 28, 29 proper and their high pliability due to their tandem connection but also by the non-linear relationship between the vertical motions of the axles 2 and the arcuate motions of the articulated joints 36, 37 between the ends 34, 35 of the springs 28, 29, respectively, and the double-arm levers 38 caused by the kinematic linkage between said double-arm levers 38 and their corresponding axle 2, said linkage ensured by shackles 40. A specific feature of this suspension lies in the fact that during the rebound stroke or when the transport vehicle loses contact with the bearing surface for some reason or other (e.g. when it is suspended from slings), the axles 2 tend to move down relative to the frame 1. This causes a certain interaction between the shackles 40 and double-arm levers 38 which converge clockwise and counterclockwise. Then the springs 28, 29 come in rigid contact with the projection 33 of the strip 32 and start functioning as an integral flexible means taking static or, in the case of a rebound stroke, dynamic forces from the axles 2 and other suspension elements associated therewith.

The fully articulated suspension of tandem wheels of a transport vehicle having the frame 1 with three axles 2 (FIG. 5) may be regarded as a combination of two fully-articulated suspensions. Therefore, the principles and peculiar features of the fully articulated suspension illustrated in FIG. 1 apply in this case too.

The present invention permits obtaining the desired non-linear characteristic of the fully articulated suspension thus promoting the quietness of movement of the transport vehicle.

In addition, the present invention permits a substantial reduction in the metal content of the fully articulated suspension.

And one more advantage of the present invention lies in simplification of manufacture and assembly of the fully articulated suspension.

INDUSTRIAL APPLICABILITY

The present invention can be utilized in transport vehicles moving on tandem wheels or rolls.

We claim:

1. A fully articulated suspension of tandem wheels of a transport vehicle having a frame with axles, said suspension comprising at least one pair of double-arm levers each of which mechanically linked with the frame and the corresponding axle of the transport vehicle, means for absorption of dynamic loads each of said means being articulated to one of the arms of the corresponding double-arm lever, and torque reaction rods, one end of each rod being connected with the frame while its other end is connected with the corresponding axle of the transport vehicle, characterized in that said suspension additionally contains as many means (8) for the transmission of static and dynamic loads as there are double-arm levers (3), said loads arising due to interaction of each axle (2) of the transport vehicle with the corresponding means (21) for absorption of dynamic loads via the other arm (4) of the double-arm lever (3), each of them being mechanically linked with the corresponding axle (2) of the transport vehicle and with the other one of said arms (4) of the double arm lever (3), each means (21) for absorption of dynamic loads comprising two stirrup-shaped plate springs (22, 23 or 28, 29) which ensure a constant contact between each means (8) for transmission of static and dynamic loads with the corresponding axle (2), each of said springs being articulated with the first of said arms (5) of the corresponding double-arm lever (3).

2. A fully articulated suspension as claimed in claim 1, characterized in that the stirrup-shaped plate springs (22, 23) are arranged in parallel to each other while the ends of each spring are articulated with corresponding double-arm levers (3) of corresponding pair of double-arm levers (3).

3. A fully articulated suspension as claimed in claim 1, characterized in that the stirrup-shaped plate springs (28, 29) are arranged in tandem and one end (30) of one of them is mechanically linked with the closer end (31) of the other one and their other ends (34, 35) are articulated with corresponding double-arm levers (38) of corresponding pair of double-arm levers (38).

4. A fully articulated suspension as claimed in claim 2, characterized in that each means (8) for transmission of static and dynamic loads includes a pack (9) of leaf springs (10) one ends of which are arranged on the corresponding axle (2) of the transport vehicle, a slot (11) accommodated in the body (4) of the first of said arms (4,5) of the double-arm lever (3) and which accommodates the other ends of the leaf springs (10) of the pack of leaf springs (9) and a clamp plate (12) mounted on said ends of the leaf springs (10) above the slot (11).

5. A fully articulated suspension as claimed in claim 3, characterized in that each means for transmission of static and dynamic loads is made in the form of a shackle (40) one end of which is articulated with a corresponding axle (2) of the transport vehicle and the other end is articulated with a corresponding double-arm lever (38).

6. A fully articulated suspension as claimed in claim 3, characterized in that the mechanical linkage between the closer ends (30, 31) of stirrup-shaped plate springs (28, 29) of means (21) for absorption of dynamic loads is carried out by a fixing element additionally included into said means and articulated with said ends (30, 31).

7. A fully articulated suspension as claimed in claim 6, characterized in that the fixing element of means (21) for absorption of dynamic loads is made in the form of a strip (32) with a projection (33), said strip being arranged between the closer ends (30, 31) of the stirrup-shaped plate springs (28, 29).

* * * * *